UNITED STATES PATENT OFFICE.

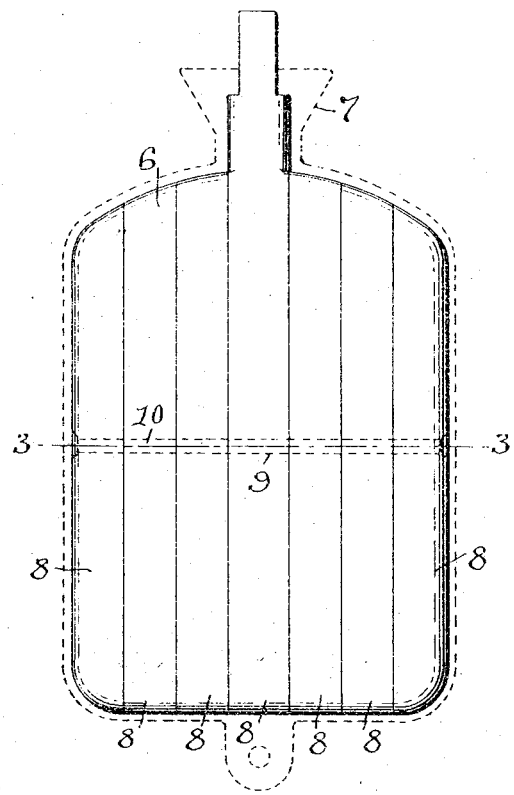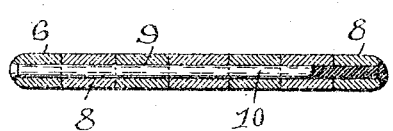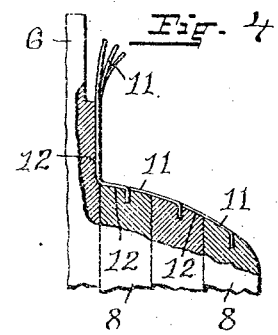

TOM HOWARD AND GEORGE BENJAMIN CLEGG, OF PROVIDENCE, RHODE ISLAND.

SECTIONAL CORE FOR HOLLOW RUBBER ARTICLES.

1,113,009.  Specification of Letters Patent.  Patented Oct. 6, 1914.

Application filed July 22, 1913.  Serial No. 780,465.

*To all whom it may concern:*

Be it known that we, TOM HOWARD and GEORGE BENJAMIN CLEGG, citizens of the United States, residing at Providence, in the county of Providence and State of Rhode Island, have invented a new and useful Improvement in Sectional Cores for Hollow Rubber Articles, of which the following is a specification.

In the usual construction and method of using cores for rubber water-bottles, as heretofore used, so far as known, the core proper is formed in one or more pieces entirely of a fusible metal. In this form of core and method of use, it is necessary to construct a core for each rubber water-bottle manufactured, as the core is destroyed in melting the same out of the bottle and with a material loss of fusible metal. This construction and use of fusible metal cores is extremely expensive in the manufacturing of rubber water bottles and the like.

Our invention has reference to an improvement in the art of manufacturing hollow articles and more particularly to an improvement in the construction of sectional cores for use in the manufacturing of seamless rubber hot water bottles and the like.

Although our invention may be used for various forms and sizes of cores and for various purposes, it is particularly adaptable to the construction of seamless rubber water bottles.

The object of our invention is to improve the construction of a sectional core for hollow articles, whereby the sections of the core are firmly secured together in their operative positions and are automatically released so as to be easily separated and removed through a small opening in the hollow article, on the application of heat to the core.

Another object of our invention is to simplify the construction of sectional cores for hollow articles, thereby reducing the cost of manufacturing the same.

Further objects of our invention are to simplify the operations of forming, separating and removing the sections of the core, thereby materially saving in time, cost and labor.

Our invention consists in the peculiar and novel construction of a sectional core for hollow articles, the principal feature of which is the fusible means for mechanically and rigidly securing the sections of the core together, whereby on the application of a predetermined degree of heat the various sections of the core will be automatically released, when the sections can be easily removed through an opening in the hollow article.

Figure 1. is a face view of our improved sectional core as adapted for manufacturing seamless rubber water bottles with the rubber bottle indicated in broken lines. Fig. 2 is an edge view of the sectional core. Fig. 3 is a transverse sectional view taken on line 3—3 of Fig. 1 through the core and Fig. 4 is a detail view partly in section of the upper half of a modified form of sectional core.

In the drawing 6 indicates a sectional core and 7 a rubber water bottle indicated in broken lines. The core 6 is formed of a plurality of longitudinal sections 8, 8, the central section 8 being sufficiently long to extend out through the mouth of the bottle 7. Each section 8, 8, is sufficiently narrow so that they can be easily drawn out through the mouth of the bottle and shaped so that when assembled they form the complete core 6, as shown in Fig. 1. A central transverse hole 9 is formed through the sections 8, 8, and is preferably countersunk at each end. A fusible metal fastening rod 10 is inserted through the hole 9 and secured by upsetting the ends of the rod, as shown in Fig. 3, thereby mechanically, fusibly and firmly securing the sections 8, 8, together. The rod 10 is formed of a fusible metal which becomes molten at a temperature below that destructive to vulcanizable rubber.

In the modified form as shown in Fig. 4, each section 8, 8, has a flexible wire 11 secured to its upper end. These wires 11, 11, are bent into grooves 12, 12, in the upper ends of the sections and carried out through the mouth of the bottle, to facilitate the removal of the sections.

In the use of our improved sectional core, a seamless rubber water bottle is formed around the core and vulcanized in the usual way. The heat used in vulcanizing the rubber when it reaches a predetermined degree melts the rod 10 thereby freeing the sections 8, 8, one from the other. After the bottle is vulcanized the free sections 8, 8, of the core are easily and quickly removed from the bottle through the mouth of the bottle. The fusible metal of the rod may also be saved and reformed in a rod when required.

We do not wish to confine ourselves to the exact form of fusible means shown for securing the sections of the core together, as the same may be in the form of a strip across the sections, a band surrounding the sections or other suitable forms may be used for mechanically and fusibly securing the sections together.

Having thus described our invention we claim as new:—

1. In a sectional core for hollow rubber articles, a plurality of substantially non-fusible sections forming the body of the core, fusible metal means for securing the substantially non-fusible sections of the core together, whereby on the application of a predetermined degree of heat to the core the substantially non-fusible sections are released one from the other and may be easily removed through an opening in the hollow article.

2. In a sectional core for hollow rubber articles, a plurality of substantially non-fusible longitudinal metal sections forming the body of the core, fusible metal means for detachably securing all of the sections of the core together, whereby on the application of a predetermined degree of heat to the core the fusible metal is fused and all of the sections are released one from the other and may be easily withdrawn through a small opening in the hollow rubber article.

3. A core for hollow rubber articles constructed of a plurality of substantially non-fusible metal sections placed side by side and forming the body of the core, and fusible metal means in contact with each section and adapted to mechanically and fusibly secure the sections together, whereby on the application of a predetermined degree of heat the fusible metal will fuse and the sections will be automatically released one from the other.

4. A core for hollow rubber articles the body of which is constructed of a plurality of substantially non-fusible metal sections, said sections being in contact on their sides, and a fusible metal member in internal contact with each section and adapted to mechanically and fusibly secure the sections together, whereby on the application of a predetermined degree of heat to the fusible member, the said internal fusible member will become molten, thereby automatically releasing the sections one from the other.

5. A core for hollow rubber articles constructed of a plurality of substantially non-fusible metal sections, a fusible metal rod extending through the sections, said sections being firmly secured together by enlarging the ends of the rod.

6. A core for hollow articles constructed of a plurality of sections, each having a transverse hole forming a continuous transverse hole extending through the sections, a fusible rod extending through the sections in the transverse hole, said sections being firmly secured together by upsetting the ends of the fusible rod.

7. A core for hollow articles constructed of a plurality of longitudinal sections with a transverse hole extending through the sections, a fusible rod in the transverse hole and secured to the sections, and a flexible wire secured to each section.

In testimony whereof, we have signed our names to this specification in the presence of two subscribing witnesses.

TOM HOWARD.
GEORGE BENJAMIN CLEGG.

Witnesses:
LEON E. DANFORTH,
CHAS. H. LUTHER.